(12) United States Patent
Jones et al.

(10) Patent No.: US 7,577,651 B2
(45) Date of Patent: Aug. 18, 2009

(54) SYSTEM AND METHOD FOR PROVIDING TEMPORAL SEARCH RESULTS IN RESPONSE TO A SEARCH QUERY

(75) Inventors: Rosie Jones, Pasadena, CA (US); Fernando Diaz, Northampton, MA (US)

(73) Assignee: Yahoo! Inc., Sunnyvale, CA (US)

( * ) Notice: Subject to any disclaimer, the term of this patent is extended or adjusted under 35 U.S.C. 154(b) by 608 days.

(21) Appl. No.: 11/117,658

(22) Filed: Apr. 28, 2005

(65) Prior Publication Data

US 2006/0248073 A1 Nov. 2, 2006

(51) Int. Cl.
*G06F 17/30* (2006.01)
(52) U.S. Cl. .................. 707/5; 707/3; 707/4; 707/101
(58) Field of Classification Search ........................ None
See application file for complete search history.

(56) References Cited

U.S. PATENT DOCUMENTS

| | | | |
|---|---|---|---|
| 2003/0217052 A1* | 11/2003 | Rubenczyk et al. | 707/3 |
| 2005/0125390 A1* | 6/2005 | Hurst-Hiller et al. | 707/3 |
| 2005/0210024 A1* | 9/2005 | Hurst-Hiller et al. | 707/5 |

OTHER PUBLICATIONS

Amati et al, "Query Difficulty, Robustness and Selective Application of Query Expansion", Springer Berlin / Heidelberg, vol. 2997/2004, pp. 127-137, 2004.*

Swan and Jensen; Time Mines: Constructing Timelines with Statistical Models of Word Usage; Proceedings of the 6th ACM SIGKDD International Conf. on Knowledge Discovery and Data Mining (KDD 2000), pp. 73-80, Aug. 2000.
Cronen-Townsend, Zhou, and Croft; Predicting query performance; Preceedings of the 25th Annual International ACM SIGIR Conference on Research and Development in Information Retrieval (SIGIR 2002), pp. 299-236, Aug. 2002.
Li and Croft; Time Based Language Models; Proceedings of the 2003 ACM CIKM International Conference on Information and Knowledge Management (CIKM 2003), pp. 469-475. ACM, Nov. 2003.
Aizen, et al., Traffic-based Language Models; Proceedings of the National Academy of Science; vol. 101, Suppl. 1, pp. 5254-5260, Apr. 6, 2004; Published online before print Jan. 6, 2004.
He and Ounis; Inferring Query Performance Using Pre-retrieval Predictors; Proceedings of the 11th Symposium on String Processing and Information Retrieval (SPIRE 2004), Padova, Italy, 2004.
Kleinberg; Temporal Dynamics of On-Line Information Streams; published on-line at http://www.cs.cornell.edu/home/kleinber/stream-survey04.pdf.

* cited by examiner

*Primary Examiner*—Khanh B Pham
(74) *Attorney, Agent, or Firm*—Seth H. Ostrow; Ostrow, Kaufman & Frankl LLP (57) ABSTRACT

In certain implementations, a system and/or method is provided for providing search results in response to a search query. In this implementation a temporal profile of the search query is built from temporal data associated with documents retrieved in response to the search query. From features of the temporal profile it may determined whether the search query would benefit from relevance feedback from a user. If there is a determination that the search query will benefit from the relevance feedback, relevance feedback is sought from the user. Search results are provided based on the relevance feedback.

122 Claims, 3 Drawing Sheets

SYSTEM AND METHOD FOR PROVIDING TEMPORAL SEARCH RESULTS IN RESPONSE TO A SEARCH QUERY

BACKGROUND

In information searching, many search queries are ambiguous. Ambiguity in the context of search exists when a number of possible interpretations may exist for a given query.

A query is a description of a user's search need. For web searching, a query is typically a short sequence of words that the user thinks describe the relevant document or would be in the relevant document. For email searching, a query may be words the user thinks describe the relevant email, or may be in the relevant email, such as: the name of the writer of the email; the email address of the writer of the email; the names of others who also received the email; or other information. For image searching, a query may be words which describe the image, words which may be on the same page as the image, an image which is 'like' the target image, or the like.

A document is a unit of information returned in response to a search query. For web searching, a basic document is a web page, it may for example be a web page containing a news story. For email searching, a basic document is an email. For image searching, a basic document is an image. A document may also be a log of the queries in a user search session. Fragments of these units are also considered to be 'documents', i.e. our unit of information may be a paragraph from a web page or email, or a portion of an image. A document may also be a session of user search queries.

Searching documents, generally involves looking at the words or the content of the document. What is needed is a technique for more intelligently searching such databases.

Documents with time stamps, such as news stories and emails, are an important source of information that people access daily. Traditional tools for searching these collections either ignore the temporal information, sorting by content relevance to the query, or use the timestamps simply to allow the user to sort by chronological order. Traditional methods for detailing with temporal information are inadequate in their understanding of when a query is temporally structured and dealing with a query when it is temporally structured.

What is needed is a system that does not merely construct timelines from arbitrary sets of documents, but instead a system that is able to implement this task in the context of search refinement, when appropriate. What is needed is a system that predicts when a user is interested in temporally structured information. Further, what is needed is a system that is able to present a summary of that information and to obtain feedback from the user.

SUMMARY

In certain implementations, a system and/or method is given for providing search results in response to a search query. In this implementation, a temporal profile of the search query is built from temporal data associated with documents retrieved in response to the search query. From features of the temporal profile it is determined whether the search query would benefit from relevance feedback from a user. If there is a determination that the search query will benefit from the relevance feedback, relevance feedback is sought from the user. Search results are provided based on the relevance feedback.

In some implementations, determining whether the search query would benefit from relevance feedback includes classifying the search query based on the temporal profile of the search query. This may be implemented using a combination of features of the temporal profile such as the divergence, the autocorrelation, the statistics of the rank order, or the burst model. The features are the inputs to a predictive model such as a decision tree, a neural network, a support vector machine, another learning algorithm, etc., which determines the temporal classification of the search.

In some implementations, a system and/or method for predicting an average precision of the search query is provided which includes using a combination of the features of the temporal profile along with a content feature, such as content clarity, for example. The features are the inputs to a predictive model such as a decision tree, a neural network, a support vector machine, another learning algorithm, etc., which predicts the average precision of the search query. The average precision is used to determine whether the search query would benefit from relevance feedback.

To obtain relevance feedback from the user, in certain implementations a display is constructed capable of being displayed on an interactive user interface that incorporates an indication of the temporal nature of the search query. In some implementations, this may include constructing an interactive timeline having temporal event indicators with corresponding event summaries. In certain implementations, this may include constructing a listing. The features may be used for influencing the rank order of the search results in the listing.

In certain implementations, a system and/or method for increasing the relevance of search results is provided which includes receiving a search query and identifying a temporal profile of the search query from search results retrieved by a search engine in response to the search query. It further includes determining a relevance of the temporal profile of the search query and influencing a presentation of the search results based on the temporal profile of the query. In some implementations this may further include generating an interactive timeline based on the temporal profile of the search query. In some implementations it may further include influencing a rank order of the search results in a listing In certain embodiments, a system provides search results in response to a search query. The system includes a computer adapted to receive a search query. A processor associated with the computer has processor executable instructions which include building a temporal profile of the search query from temporal data associated with documents retrieved in response to the search query. In addition, it includes determining from features of the temporal profile whether the search query would benefit from relevance feedback from a user and seeking relevance feedback from the user if there is a determination that the search query will benefit from the relevance feedback from the user. It further includes providing search results based on the relevance feedback.

DESCRIPTION

Temporal information associated with a document may be exploited in several ways to improve searching. The temporal information may be document time stamps, creation dates, dates within a document, etc.

Figure 1:
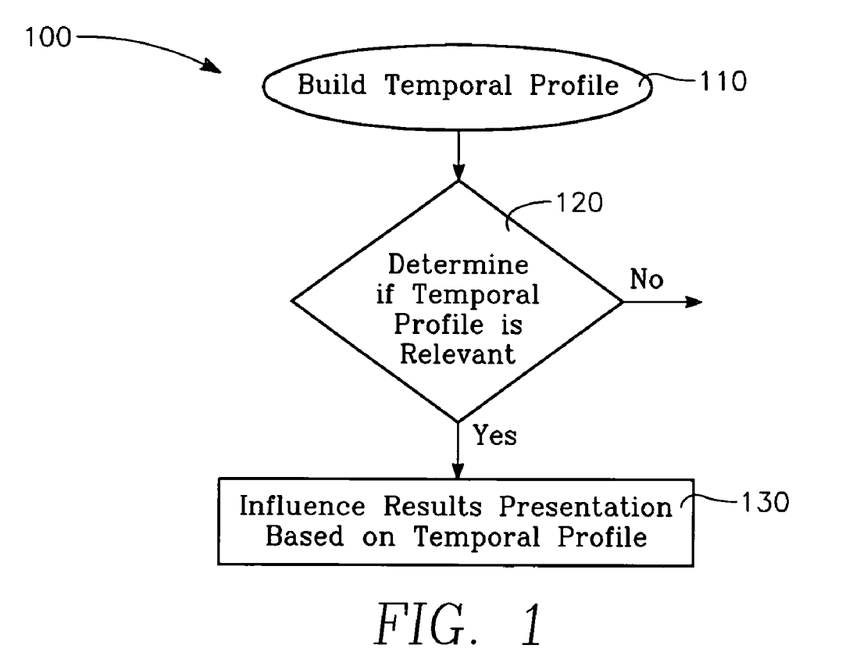
FIG. 1 shows a simplified flow chart in accordance with one implementation of the present invention.

FIG. 1 shows a simplified flow chart 100 in accordance with one implementation of the present invention. From the temporal information associated with a document, it is possible to build a temporal profile 110 of a set of documents retrieved as a result of a query. The temporal profile of the query is examined to determine if the temporal profile is relevant 110 and can be used to improve search results. In certain implementations, the temporal distribution of the documents in a results set may be classified to determine if the temporal properties can be used to improve the search results. In certain implementations, the temporal distributions may be used to predict the precision of the documents retrieved in response to the query.

The temporal classification and/or the precision prediction is used to determine whether further processing, or feedback from the user may be used to improve query results. If the temporal profile indicates the temporal profile is relevant, it may be used to influence the results presentation 130. In one implementation this may include presenting an interactive timeline to the user having annotations with information extracted from the documents to facilitate feedback from the user. In other implementations, the ranking of results in a listing may be changed to improve relevance, or to facilitate feedback from the user.

As such, in some implementations, a technique is defined for constructing a computational description of the temporal dimension of the query. That is, given a query, the events relevant to that query are modeled. Two example techniques, temporal classification and precision prediction, using temporal features, are defined below. These techniques allow an understanding of the temporal behavior of a query and facilitates the automation of the decision of whether to elicit relevance feedback, or modify an information retrieval system in other ways. In one implementation of relevance feedback, the user is allowed to interact with the interface to select spans of time that are relevant, so that the search results can be automatically modified on the basis of the selected timespan. A technique is defined below for visualizing the temporal description of the query. Thus, some implementations allow the retrieval system to analyze the query and to present a timeline of events when relevant, and modify search results for the user based on interaction with the timeline.

I. Temporal Profiles

One way to analyze a query is to construct a computation description of the temporal dimension of the query. In a specific implementation, a probability distribution is built over the dates covered in the corpus by inspecting the documents returned by the search engine. The dates of the top documents are used to construct this probability distribution. This can be accomplished by inspecting the top N documents of an initial retrieval and calculating the statistical properties of terms occurring in this set of documents. In language modeling context, we rank the documents in the collection according to their likelihood of having generated the query:

$$P(Q|D) = \prod_{w \in V} P(w|D)^{q_w} \qquad \text{Equation 1}$$

Where, $q_w$ is the number of times the word w occurs in the query. Document language models, P(w|D), are estimated using the words in the document. Using this ranking, we can build a query language model, P(w|D), out of the top N documents, $$P(w|Q) = \sum_{D \in R} P(w|D) \frac{P(Q|D)}{\sum_{D' \in R} P(Q|D')} \qquad \text{Equation 2}$$

where R is the set of top N documents and there is a uniform prior over the documents.

To examine a temporal profile of the query, by analogy with the content-based profile described above, a temporal query model is initially defined as:

$$\tilde{P}(t|Q) = \sum_{D \in R} \tilde{P}(t|D) \frac{P(Q|D)}{\sum_{D' \in R} P(Q|D')} \qquad \text{Equation 3}$$

where the granularity is on the day scale and $$\tilde{P}(t|D) = \begin{cases} 1 & \text{if } t \text{ is equal to the document date, } t_D \\ 0 & \text{otherwise.} \end{cases} \qquad \text{Equation 4}$$

It is often helpful to smooth maximum likelihood models such as $\tilde{P}(t|Q)$. We used a two stage process to smooth the models. First, P(t|Q) is smoothed with a background model. Background smoothing plays two roles. Firstly, background smoothing handles potential irregularities in the collection distribution over time. For example, certain dates may have a large number of articles compared to others. Secondly, background smoothing replaces zero probability events with a very small probability, allowing us to assign a very small likelihood of a topic being discussed on days where we have no explicit evidence. The distribution of the collection over time served as a background model. This collection temporal model is defined by:

$$\tilde{P}(t|C) = \frac{1}{|D|} \sum_{D} \tilde{P}(t|D). \qquad \text{Equation 5}$$

Our estimate can then be linearly interpolated with this reference model such that $$P'(t|Q) = \lambda \tilde{P}(t|Q) + (1-\lambda)\tilde{P}(t|C). \qquad \text{Equation 6}$$

Since our model is discrete at the level of a single day, and news stories on a single topic may occur over a period of several days, we smooth our estimate of the model for a single day with the model for adjacent days. These kinds of smoothing techniques have been explored in the field of time series analysis. We use simple moving average smoothing. The smoothed estimate for a particular day is defined according to the previous p days, $$P(t|Q) = \frac{1}{\phi} \sum_{i=0}^{\phi-1} P'(t-i|Q).  \qquad \text{Equation 7}$$

Figure 3:
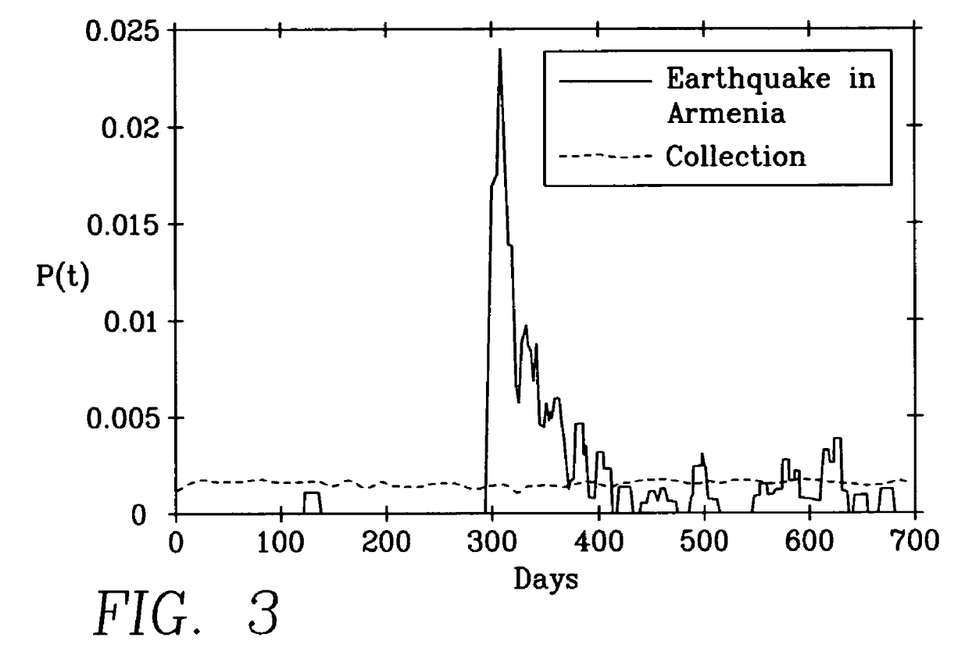
FIG. 3 shows a temporal profile of documents returned in response to the query "earthquake in Armenia".

In one example, the period, $\phi$, is always 14, smoothing the probability for a day with the 14 preceding days, but not subsequent days. Improvements could be made by smoothing with days both before and after the reference day. P(t|Q) is our final estimate of the distribution. FIG. 3 shows a temporal profile for the query, "earthquake in Armenia".

II. Features of Temporal Profiles

The features of the probability distribution, discussed above, are used in determining when it is appropriate to require relevance feedback from the user. Analysis of the probability distribution involves extracting a set of features from the distribution.

The following set of features may be used for discriminating between temporal profiles. The features may be used in classifying the query and/or to predict the precision of queries as discussed further below. The below features are described for example purposes, other features are possible.

A. Kullback-Leibler Divergence

In language model based information retrieval, query clarity is meant to capture the effectiveness of the query at retrieving a precise topic. This content clarity measure assumes that the distribution of words in documents retrieved for a good query will be distinct from the background distribution. The clarity measure is defined as the Kullback-Leibler or KL divergence between the query language model P(w|Q) and the collection language model. Formally, the clarity score is defined as, $$D_{KL}(P(w|Q)), P(w|C) = \sum_{w \in V} P(w|Q) \log \frac{P(w|Q)}{P(w|C)}. \qquad \text{Equation 8}$$

A larger KL divergence indicates a clearer query. This clarity measure is herein referred to as "content clarity."

In the temporal domain, a temporal KL divergence may be provided by measuring the difference between the distribution over time of documents retrieved in response to a query, and the distribution over time of documents in the collection as a whole. This can be quantified by taking the KL divergence between the collection temporal model and the query temporal model. That is, $$D_{KL}(P(t|Q), P(t|C)) = \sum_{t=1}^{T} P(t|Q) \log \left( \frac{P(t|Q)}{P(t|C)} \right). \qquad \text{Equation 9}$$

This feature is referred to herein as the temporal KL divergence or temporal KL. A relatively a-temporal query exhibits a lower KL divergence. Shown in FIG. 5, the spiky nature of the example query, "hostage taking" is clearly captured by this feature. Shown in FIG. 2 the relatively a-temporal query of "poaching" exhibits a much lower KL divergence.

It is significant to note that although temporal KL identifies the deviation of documents retrieved for a query from the general distribution of documents over time, it may not provide significant distinction between queries corresponding to events taking place at a single time, (for example "turkish earthquake 1999") and temporally ambiguous queries (such as "iraq war").

B. Autocorrelation

While the KL divergence gives a test of similarity to the temporal background model P(t|Q), it does not provide a measure of the randomness of the query time series. To test this, we use the first-order autocorrelation of the time series, $$r_1 = \sum_{t=1}^{T-1} \frac{\left(P(t|Q) - \frac{1}{T}\right)\left(P(t+1|Q) - \frac{1}{T}\right)}{\sum_{t=1}^{T} \left(P(t|Q) - \frac{1}{T}\right)^2}. \qquad \text{Equation 10}$$

The autocorrelation of a uniform distribution is $r_1=0$. A high autocorrelation value suggests a structure to the time series. This will be the case for queries which contain a strong inter-day dependency. For example, autocorrelation is high in cases where a high P(t|Q) tends to predict a high P(t+1|Q); likewise with low values. Such behavior indicates that there is predictability to the time series.

Figure 5:
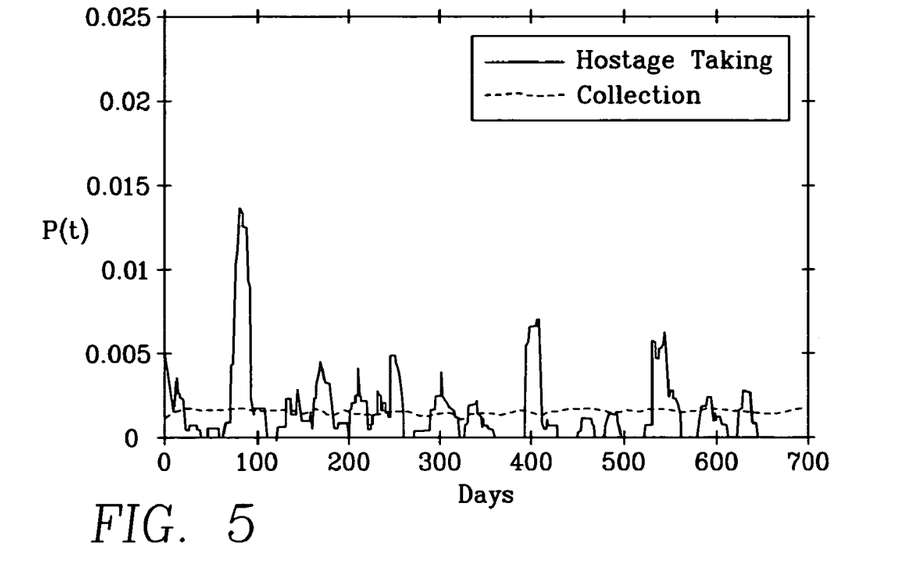
FIG. 5 shows a temporal profile of documents returned in response to the query "hostage taking".

In FIG. 5, the bursty episodes indicative of hostage events contribute to a higher autocorrelation. Similarly, the relative uniformity of the "poaching" query leads to a smaller autocorrelation.

C. Statistics of the Rank Order of P(t|Q)

Another way to capture the dynamics of the time series is to consider the rank order of the time series. In these cases, the days are recorded in decreasing P(t|Q). The features then are the statistical properties of the decay of P(t|Q). Thus, the kurtosis of the rank order may be examined. The kurtosis is defined by, $$\text{kurtosis} = \frac{\mu_4}{\mu_2^2} \qquad \text{Equation 11}$$

where $\mu_i$ is the $i^{th}$ central moment. The kurtosis measures the peakedness of the curve.

As with temporal KL, the peaky nature of FIG. 5 is represented in this feature. In this case, however, we inspect the rank ordered distribution.

D. Burst Model

A measure for temporality also follows from Kleinberg's burst model. In this model it is assumed that a state machine emits some number of relevant documents in each state. In one state, the low or idle state, few documents are emitted. If our time series is assumed to have been generated by such a machine, the idle state, corresponds to a uniform distribution of N documents over the time span being considered. The event state corresponds to a faster rate of document production.

In one implementation Klienberg's $\beta_s^2$ automaton, known in the art, may be utilized for this purpose. Kleinberg's $\beta_s^2$ is described by J. Kleinberg in *Bursty and Hierarchical Structure in Streams*, Proc. 8th ACM SIGKDD Intl. Conf. on Knowledge Discovery and Data Mining, 2002, available at http://www.cs.cornell.edu/home/kleinber/.

Given this automaton, it is possible to use dynamic programming to find the most likely state sequence which replicates the data. For the two-state model, the transitioning behavior of the machine is of interest. Three features of this transition sequence are chosen. First, Kleinberg's weight of the burst is computed. The weight of a burst is essentially the savings of taking the burst path over the idle path in the decoding. Second, the average length of time the machine is in the idle state before transitioning into the event state is computed. Finally, the number of transitions to the event emission state is computed.

The burst weight will show the "intensity" of the time profile when relevant documents are found. This may reflect queries corresponding to high-intensity situations, which are distinct from the background model. The average length of time the machine is in the idle state gives a measure of the overall significance of the topic over the time span in the collection. The number of transitions may capture the number of episodes present in the collection.

Figure 2:
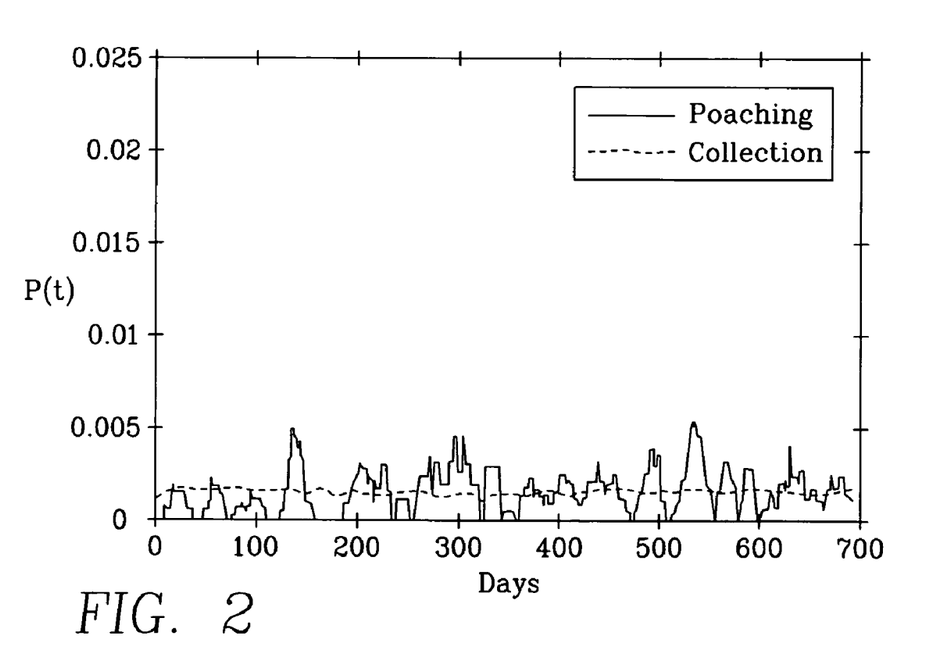
FIG. 2 shows a temporal profile of documents returned in response to the query "poaching".

The burst model for the profile for "poaching", shown in FIG. 2 spends most of the time in the idle state and has few transitions into the event state. As applied to the example in FIG. 5, the model for "hostage" transitions five times and spends, on average, half as much time in the idle state. Combined with intensity measure, these features point to a more temporally structured query.

Using the above discussed features, the temporal distribution of the documents in a results set may be examined to determine if the temporal properties can be used to improve the average precision of the query. Temporal classification and/or precision prediction using temporal features are two potential mechanisms that may be utilized to determine if the temporal properties can be used to improve the search results. In such cases, one way to improve results is through relevance feedback. Relevance feedback may be obtained through an interactive visualization of the temporal properties of the results set, and used to modify the algorithm for retrieving documents.

III. Temporal Classification

A query may be divided into temporal classes by distinguishing common patterns of the profiles of the documents retrieved in response to queries. As discussed above, it is possible to construct profiles of queries by examining the distribution of the documents it retrieves across the time space of the corpus. FIGS. 2-5 show the temporal profiles for several queries. Note that the temporal profiles may contain several spikes, which may correspond to bursts of documents appearing at particular times in the span of the collection. The temporal profiles are constructed as discussed above. The features are used to classify queries into several classes, queries that are likely to discuss one event (temporally unambiguous), queries that are likely to discuss no events (atemporal), and/or queries that are likely to discuss several events (temporally ambiguous). Below are described the three temporal classes of queries: atemporal queries; temporally unambiguous queries; and temporally ambiguous queries.

A. Atemporal Queries

Atemporal queries are relatively time-invarient with respect to the document collection. FIG. 2, for example, shows the time-relevance profile P(t|Q) of a query, "poaching". This topic is of perennial interest, and thus no structure is seen in the profile. FIG. 2 illustrates the temporal profile of the query "poaching" (TREC Topic 77) estimated from the AP 1988 and 1989 collection. The retrieved documents are more or less evenly distributed across the collection time span. The background collection distribution P(t|C), shown as a dashed line, is plotted as a reference.

Atemporal queries can correspond to a topic which is ongoing. While the details of documents relevant to the query may change over time, we expect their distribution in time to be similar to the overall distribution of documents. When overall document volume increases, typically the volume of documents relevant to atemporal queries increases too.

B. Temporally Unambiguous Queries

Figure 4:
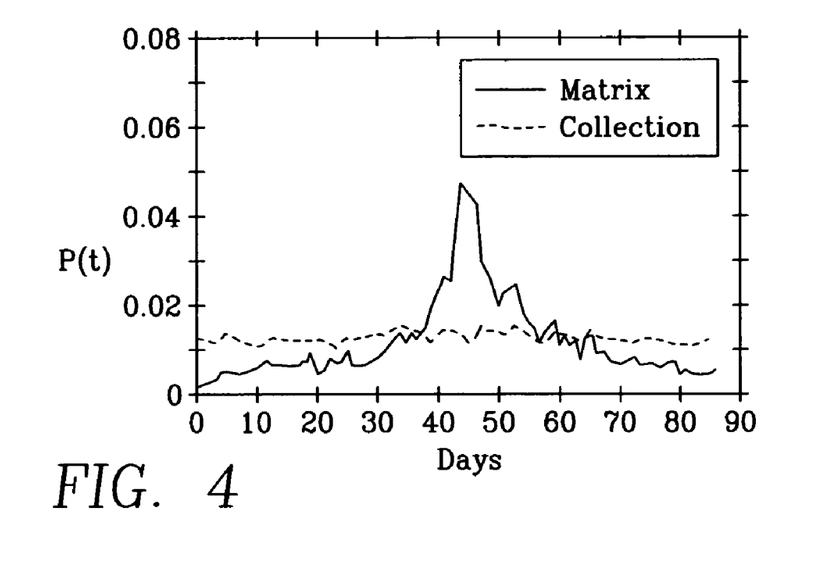
FIG. 4 shows a temporal profile of documents returned in response to the query "matrix".

Temporally unambiguous queries are relatively distinct with respect to the time dimension. For example, the query "turkish earthquake 1999" refers to a specific span in time. FIGS. 3 and 4 show the profiles for two queries, "earthquake in Armenia" and "matrix" respectively. These profiles suggest that the queries refer to a specific point or period in time. In addition, these examples demonstrate the difference between unanticipated events such as natural disasters and anticipated events. The temporal profile of FIG. 3 shows spike with a steep rise and a relatively smoother decline, behavior characteristic of an unexpected event such as a natural disaster. On the other hand, FIG. 4 shows a more gradual rise and smooth decline of the query "matrix", depicting the temporal profile of an anticipated event such as a movie release.

Note that a query is only temporally unambiguous with respect to a specific collection. For example, if a web search log were extended both forward and backward in time, several peaks in interest would exist (placing it into the next class—temporally ambiguous). Similar behavior would exist if there were another earthquake in Armenia in our collection, for example.

C. Temporally Ambiguous Queries

Temporally ambiguous queries refer to the combination of several events and hence might be considered ambiguous if the user is looking of information about a specific event. A temporally ambiguous query is likely to identify several incidents or events. The profile will have several incident or event peaks distinguishable from the collection. FIG. 5 shows the profile of the query "hostage taking". In FIG. 5 the profile has a less distinct temporal profile than the temporally unambiguous queries shown in FIGS. 3 and 4, but is nonetheless distributed quite differently from the temporal profile of the entire collection (shown in dashed line). It is significant to note that a subclass of temporally ambiguous queries would include periodic queries.

When a query is classified as temporally ambiguous, the query results may be displayed to the user in a format that exploits the temporal nature of the query. In cases where a query is likely to discuss several events (temporally ambiguous), the system may seek relevance feedback by presenting a timeline interface for refining the query. The temporally ambiguous results may be displayed in a timeline format to allow the user to select a temporal time frame, or a result identified with a temporal time frame. Or, the rank order of results may be influenced in a listing to better capture the user's intent. For example, the results from different temporal events may be interleaved to ensure display of results from each of temporal event. In another implementation, only results from one or more selected temporal events are displayed based on user specific data, on general user information, or on other information (information about the documents in the listing, the likelihood of certain selections, etc.).

D. Classifying Queries

Predictive models may be employed for classification of queries. Decision trees, neural networks, support vector machines, other learning algorithms, or the like may be utilized to classify queries. For example, a decision tree may be trained to classify a query. The input to the decision tree is the set of temporal features of the distribution. The tree is then trained to classify queries into the categories of temporal behavior. The results of the classification are used to determine if/what type of relevance feedback could be used to refine the query.

In some implementations, it may not be necessary to utilize all the above discussed features for classification. Furthermore, of the above classifications, temporally ambiguous queries indicate a strong candidate for temporal relevance feedback. For example, in some implementations, such as when seeking relevance feedback, it may only be necessary to identify temporally ambiguous queries as distinguished from the other classifications. Conversely, identifying a query as non atemporal and not temporally unambiguous may indicate that the query is a candidate for temporal relevance feedback. In other implementations, it may be useful to fully classify the query so that additional temporal analysis may be performed. Furthermore, full classification may be desirable to determine if the classification of the query is identifiable at all. Information about whether the trained predictive model is capable of classifying a query can be used to decide if further analysis is required to determine if relevance feedback would be beneficial.

IV. Precision Prediction Using Temporal Features

Temporal features may be utilized in predicting average precision. Although the temporal features in isolation, are not, for the most part, predictive of average precision. The combination of temporal features with each other and/or content clarity is predictive of average query precision. Content clarity was shown to correlate with average precision when using the Spearman rank-correlation by Cronen-Townsend et al., in a publication entitled "Predicting query performance," published in *Proceedings of the 25th Annual International ACM SIGIR Conference on Research and Development in Information Retrieval (SIGIR* 2002), pages 299-306, August 2002, herein incorporated by reference in its entirety. It does not, however, permit the system to predict the likely precision of any individual query, beyond a binary classification. The combination of the temporal features with each other and/or content clarity, may be utilized to improve the accuracy of predictive models.

For more complex nonlinear relationships, the more effective predictive models include neural networks, support vector machines, other learning algorithms, a domain expert (person), or the like. As such, in one implementation, a neural network is trained for detecting when a query is likely to fail at providing the most relevant results. A combination of the temporal features discussed above along with content clarity may be provided as input to train a neural network to predict average precision. The input features may be normalized, i.e. to lie between zero and one, by shifting and scaling values.

Thus, the input to the neural network is the set of features of the distribution. The objective function is the average precision of the system. By leveraging known system performance on previous queries, it is possible to detect when queries are likely to fail. If failure is likely, the system may seek user feedback, such as by presenting an interactive timeline interface to the user for refining the query.

In some implementations, precision prediction based on content and temporal features may be combined with other relevance indicators to further improve results. For example, if the prediction of precision is low (documents are likely to be irrelevant), indicating that it might be useful to get some kind of feedback, then the query could be classified using the classifications above to ascertain the type or level of temporal feedback that is required.

It is significant to note that in addition to content clarity, the temporal features can be combined for precision prediction with other indicators able to predict the quality of the results. This may include for example, information about the user, ambiguity of the query, and the quality of the documents returned, such as the reliability of the source, authoritativeness of the document, link analysis, level of familiarity needed to understand the document, etc.

V. Relevance Feedback

If a query is in need of relevance feedback, i.e. it is classified as temporally ambiguous or its average precision is too low, results may be presented in sequential order, chronological order, and/or chronologically interleaved in a results listing displayed to the user for feedback. Or, if the results are classified as temporarily ambiguous or have low average precision, presentation of a timeline to user, which illustrates the temporal ambiguity and allows the user to select the temporal region that they are interested, will help improve the average precision of the results. In one implementation, the average precision of the top results from a query classified as temporally ambiguous could be compared to assist in selecting a presentation format and/or listing order for presenting the results set to the user for feedback.

Thus, certain implementation allow the user to interact with an interface to select spans of time that are relevant, and automatically modify the search results on the basis of the selected timespan. In one implementation, the user is permitted to select from ranges of dates within the timeline presented, on the basis of the document summaries. The selection is used to modify the algorithm for retrieving documents.

There are several ways to modify the algorithm for retrieving documents. In one implementation, the algorithm is modified so that it returns documents only from the selected time period. In another implementation, the algorithm is modified so that it weights documents from the selected time period more highly than other time periods in the results listing. In yet another implementation the algorithm is modified to give preference to documents that are similar to the documents of the selected time period and/or different from documents in the time periods that were not selected. Other implementations for modifying the algorithm are possible.

VI. Visualization of Temporal Distributions

A means to perform query-specific relevance feedback based on the temporal properties of a query is to provide a display of the distribution of relevant documents over time, as well as an associated indicator of the content of those documents. As such, in some implementations, temporal feedback may be obtained through an interactive timeline, which provides a visualization of the temporal nature of the search results. In one possible implementation, a timeline is constructed from the probability distributions discussed above. This includes identification and summarizing of spans of time relevant to the user's query.

Identification of the relevant spans of time is accomplished by using the temporal representation as the input to Kleinberg's burst-detection algorithm. The output of Kleinberg's algorithm is the set of dates which represent events in time. The summary for a particular event is generated by inspecting the documents whose timestamps are within the range of the event. Given these documents, a probability distribution of terms occurring in the documents is built. This is referred to as the event model. A document title is selected from this set which is most likely to have been generated by the event model. This most likely title may be used as the event summary.

In the case where the component events of a query are non-overlapping the information may be segmented into an annotated timeline. (For overlapping events, small adjacent events may be grouped together and designated as sub-events.) This task may be divided into three parts: 1) determining the time-spans corresponding to events; 2) constructing a language model for each event; and 3) using the event language models to build event summaries.

The time spans can be extracted from the state sequence decoding of the burst model. Event language models can be constructed by using the documents which lie within the time-spans as evidence for the event language model. So, if the burst model decoding indicated that an event occurred during a particular two week range, a subset of the original top N documents would be used to make the event language model. Formally, $$\hat{P}(w \mid E) = \frac{1}{|E|} \sum_{D \in E} P(w \mid D) \qquad \text{Equation 12}$$

where E us the subset of top N documents within the particular timespan. This equation calculates the maximum likelihood estimate for this distribution. Subsequent references to P(w|E) represents the maximum likelihood model smoothed using Jelinek-Mercer smoothing with a weight of 0.2 for the background model.

Given these event language models, two example implementations for presenting summaries of their information to the user are as follows. In one implementation, the distribution of terms in P(w|E) is inspected. As presenting a list of terms in order of decreasing probability might result in many corpus-wide high-probability terms being displayed, instead, a pointwise Kullback-Leibler divergence measure of per-term contribution to the equation $$D_{KL}(P(w \mid Q)), P(w \mid C) = \sum_{w \in V} P(w \mid Q) \log \frac{P(w \mid Q)}{P(w \mid C)} \qquad \text{Equation 8}$$

Specifically, the pointwise Kullback-Leibler divergence is defined as, $$\delta(p \| q) = p(w) \log \frac{p(w)}{q(w)} \qquad \text{Equation 13}$$

where p is our event model and q is some reference distribution over words. This gives a measure of the distinguishing quality of each work in the event model with respect to the reference model. Using the collection language model as a reference distribution could result in a good summary of the query as a whole, but many not serve to distinguish between the events in the topic. Therefore, the query language model, P(w|Q), is the reference model, which may be estimated according to Equation 2 above. Thus, the terms in our event model are ranked according to $\delta(P(w|E) \| P(w|Q))$. The top terms from the list, referred to herein as a "non-extractive summary" are obtained. The non-extractive summary may contain several of the top terms, for example five terms, for each temporal event. The non-extractive terms may be presented to the user as discussed below.

Another way to generate summaries from the event models is to consider sentences from the set of in-event documents. A "sentence likelihood" refers to the sentence level analog of document likelihood such that:

$$P(s \mid E) = \prod_{w \in V} P(w \mid E)^{s_w} \qquad \text{Equation 14}$$

where $s_w$ refers to the number of times word, w, occurs in the sentence. If S is the set of all sentences in these documents, the likelihood of each sentence is calculated and the most likely sentence selected for presentation to the user. The event summary is the sentence s*, with the highest likelihood, $$s^* = \mathrm{argmax}_{s \in S} P(s \mid E) \qquad \text{Equation 15}$$
$$= \mathrm{argmax}_{s \in S} \prod_{w \in V} P(w \mid E)^{s_w}$$

To obtain relatively high precision and useful summaries, S can be restricted to the set of document titles. The most likely title is referred to herein as an "extractive summary" of an event.

Figure 6:
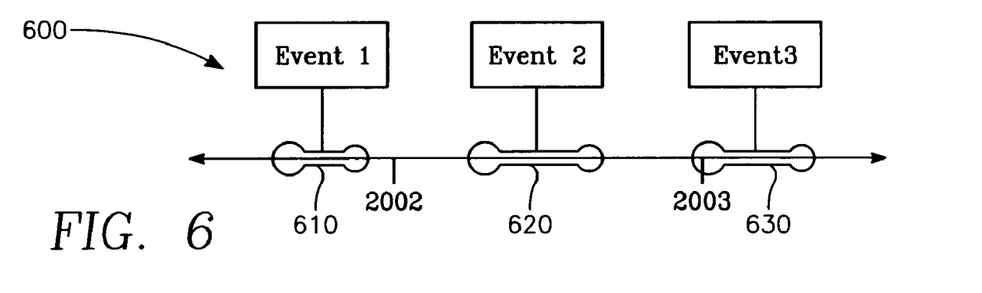
FIG. 6 shows one possible example of an interactive timeline in accordance with one implementation of the present invention.
Figure 7:
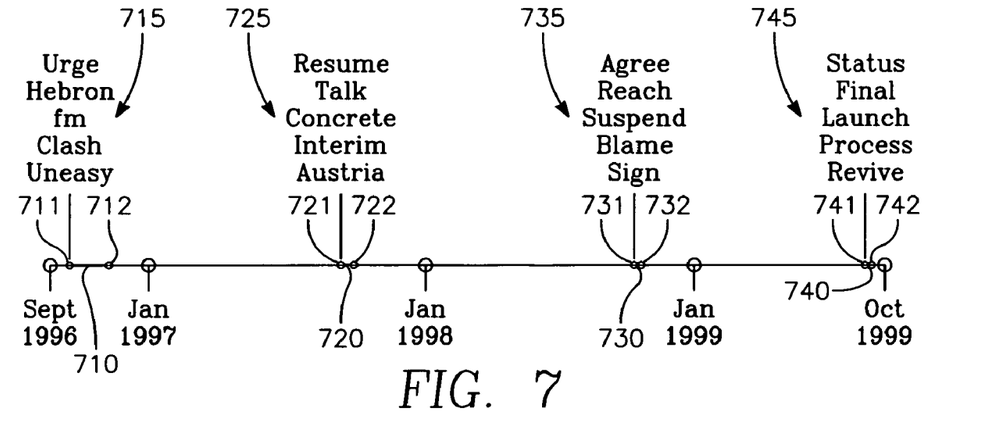
FIG. 7 shows one possible example of an interactive timeline in accordance with one implementation of the present invention.

The results may be shown on time line with the summary of the documents over its corresponding period. This shows the user that different period exist. This may be shown with a timeline with single event indicators or with range indicators, for example hash marks, dots, bars, etc. The presentation could include only one result from each period. FIG. 6 shows one possible example of an interactive timeline 600 with range bars 610, 620, and 630 with summary blocks or for event 1, 2, and 3 summaries, respectively. The event blocks 1, 2, and 3 may contain text, or pop-up or pull-down menus. FIG. 7 illustrates a timeline 700 used to visualize a temporal profile of the query "Israel-Palestine". Kleinberg's burst model was used to detect event boundaries 711 and 712, 721 and 722, 731 and 732, and 741 and 742. Event language models are built from documents within the bounded ranges 710, 720, 730, and 740. The non-extracted event summaries 715, 725, 735, and 745 consist of the terms with the highest point Kullback-Leibler divergence with respect to the collection language model.

As an alternative to the timeline, a listing of result could be displayed taking into account the identified periods. The presentation order of the results may be changed according to the identified period.

The foregoing description has been presented for the purposes of illustration and description. It is not intended to be exhaustive or to limit the invention to the precise form or method disclosed. The above description is not limited to the specific implementations, embodiments, context, or examples discussed above. Aspects of some implementations, embodiments, or examples may be combined with other implementations, embodiments, or examples. Further, not all aspects of the implementations, embodiments, or examples are required in every implementation, embodiment, or example. Many modifications and variations are possible in light of the above teaching. It is intended that the scope of the invention be limited not by this description, but rather by the claims appended hereto.

What is claimed is:

1. A method for providing search results in response to a search query from a user, the method comprising:
   building a temporal profile of the search query from temporal data associated with documents retrieved in response to a search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   identifying the search query as one of temporally ambiguous, temporally unambiguous or atemporal to the user;
   determining from features of the temporal profile, including the identification of the search query as being temporally ambiguous, temporally unambiguous or atemporal, whether the search query would benefit from relevance feedback from the user;
   seeking the relevance feedback from the user if there is a determination that the search query will benefit from the relevance feedback from the user; and
   providing search results based on the relevance feedback.

2. The method of claim 1 wherein determining comprises classifying the search query based on the temporal profile of the search query.

3. The method of claim 2 wherein determining comprises using a combination of features comprising: (a) divergence; (b) autocorrelation; (c) statistics of the rank order; or (d) burst model.

4. The method of claim 2 wherein determining comprises using a combination of features comprising: (a) Kullback-Leibler divergence; (b) autocorrelation; (c) kurtosis; (d) Kleinberg's burst model.

5. The method of claim 1 wherein determining comprises predicting an average precision of the search query using a combination of the features of the temporal profile.

6. The method of claim 5 wherein determining comprises predicting an average precision of the search query using a combination of the features of the temporal profile and a content feature.

7. The method of claim 6 wherein determining comprises using a combination of features comprising: (a) divergence; (b) autocorrelation; (c) statistics of the rank order; or (d) burst model.

8. The method of claim 6 wherein determining comprises using a combination of features comprising: (a) Kullback-Leibler divergence; (b) autocorrelation; (c) kurtosis; (d) Kleinberg's burst model.

9. The method of claim 8 wherein determining comprises using a content clarity.

10. The method of claim 8 wherein determining comprises using the Kullback-Leibler divergence.

11. The method of claim 10 wherein determining comprises using a content clarity.

12. The method of claim 6 wherein predicting the average precision comprises using a predictive model.

13. The method of claim 12 wherein predicting the average precision comprises using a learning algorithm.

14. The method of claim 13 wherein predicting the average precision comprises using at least one of: (a) a decision tree; (b) a neural network; or (c) a support vector machine.

15. The method of claim 1 wherein seeking relevance feedback from the user further comprises constructing a display capable of being displayed at an interactive user interface, the display incorporating an indication of a temporal nature of the search query.

16. The method of claim 15 wherein constructing a display comprises a constructing a timeline comprising temporal event indicators and corresponding event summaries.

17. The method of claim 16 wherein constructing a display comprises constructing a non-extractive event summary.

18. The method of claim 16 wherein constructing a display comprises constructing a sentence likelihood event summary.

19. The method of claim 16 wherein constructing a display comprises constructing an extractive event summary.

20. The method of claim 15 wherein constructing a display comprises a constructing a listing.

21. The method of claim 1 wherein building temporal profile comprises smoothing the temporal data.

22. The method of claim 1 wherein providing search results comprises modifying an algorithm for retrieving documents.

23. A method for providing search results in response to a search query from a user, the method comprising:
   building a temporal profile of the search query from temporal data associated with documents retrieved in response to a search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   identifying the search query as one of temporally ambiguous, temporally unambiguous or atemporal to the user
   classifying the search query using the temporal features of the temporal profile including the identification of the search query as temporally ambiguous, temporally unambiguous or atemporal; and
   constructing an interactive display capable of being presented to the user for obtaining query specific relevance feedback from the user if the search query is classified as temporally ambiguous.

24. The method of claim 23 wherein classifying comprises using a combination of features comprising: (a) divergence; (b) autocorrelation; (c) statistics of the rank order; or (d) burst model.

25. The method of claim 23 wherein classifying comprises using a combination of features comprising: (a) Kullback-Leibler divergence; (b) autocorrelation; (c) kurtosis; (d) Kleinberg's burst model.

26. The method of claim 23 wherein classifying comprises using a Kullback-Leibler divergence.

27. The method of claim 23 wherein constructing the interactive display comprises constructing a timeline comprising:
   a) temporal event indicators; and b) temporal event summaries corresponding with the temporal event indicators.

28. The method of claim 23 wherein predicting the average precision comprises using a learning algorithm.

29. The method of claim 28 wherein predicting the average precision comprises using at least one of: (a) a decision tree; (b) a neural network; or (c) a support vector machine.

30. A method for providing search results in response to a search query from a user, the method comprising:
   building a temporal profile of the search query from temporal data associated with documents retrieved in response to a search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   identifying the search query as one of temporally ambiguous, temporally unambiguous or atemporal to the user;
   predicting an average precision of the search query using a combination of at least one temporal feature of the temporal profile and a content feature of the documents retrieved in response to the search query, as well as the identification of the query as temporally ambiguous, temporally unambiguous or atemporal;
   determining from the average precision whether the search query would benefit from relevance feedback from the user; and
   constructing an interactive display capable of being presented to the user for obtaining the relevance feedback from the user if there is a determination that the search query will benefit from the relevance feedback from the user.

31. The method of claim 30 wherein constructing the interactive display comprises constructing a timeline comprising:
   a) temporal event indicators; and
   b) temporal event summaries corresponding with the temporal event indicators.

32. The method of claim 31 wherein predicting the average precision comprises using a combination of temporal features comprising: (a) divergence; (b) autocorrelation; (c) statistics of the rank order; or (d) burst model.

33. The method of claim 32 wherein predicting the average precision comprises using a combination of temporal features comprising: (a) Kullback-Leibler divergence; (b) autocorrelation; (c) kurtosis; (d) Kleinberg's burst model.

34. The method of claim 31 wherein predicting comprises using a Kullback-Leibler divergence.

35. The method of claim 30 wherein predicting the average precision comprises using a learning algorithm.

36. The method of claim 35 wherein predicting the average precision comprises using at least one of: (a) a decision tree; (b) a neural network; or (c) a support vector machine.

37. A method for providing search results in response to a search query comprising:
   receiving a search query from a user;
   building a temporal profile of the search query from temporal data associated with documents retrieved by a search engine in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   performing at least one of: (1) classifying the search query using the temporal features of the temporal profile; or (2) predicting an average precision of the search query using a combination of at least one temporal feature of the temporal profile and a content feature of the documents retrieved in response to the search query;
   determining from performing the at least one of classifying or predicting the average precision whether the search query would benefit from relevance feedback from the user;
   identifying the search query as one of temporally ambiguous, temporally unambiguous or atemporal to the user;
   constructing an interactive timeline for display to the user if there is a determination that the search query will benefit from the relevance feedback from the user;
   modifying the algorithm for retrieving documents based on a selection by the user from the timeline; and
   providing search results for display to the user using the modified algorithm for retrieving documents.

38. A method for increasing the relevance of search results comprising:
   receiving a search query from a user;
   identifying a temporal profile of the search query from search results retrieved by a search engine in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   identifying the search query as one of temporally ambiguous, temporally unambiguous or atemporal to the user;
   determining a relevance of the temporal profile of the search query including the relevance based on the identification of the search query as temporally ambiguous, temporally unambiguous or atemporal to the user; and
   influencing a presentation of the search results based on the temporal profile of the query.

39. The method of claim 38 wherein influencing comprises generating an interactive timeline based on the temporal profile of the search query.

40. The method of claim 39 wherein generating the interactive timeline comprises generating a timeline comprising:
   a) temporal event indicators; and
   b) temporal event summaries corresponding with the temporal event indicators.

41. The method of claim 39 further comprising receiving the temporal relevance feedback from the user input to the interactive timeline.

42. The method of claim 41 further comprising generating search results for presentation to the user based on the temporal relevance feedback received from the user.

43. The method of claim 42 wherein determining comprises predicting an average precision of the search query using a combination of at least one temporal feature of the temporal profile and a content feature of documents retrieved in response to the search query.

44. The method of claim 43 wherein predicting the average precision comprises using a combination of temporal features comprising: (a) divergence; (b) autocorrelation; (c) statistics of the rank order; or (d) burst model.

45. The method of claim 44 wherein predicting the average precision comprises using a combination of temporal features comprising: (a) Kullback-Leibler divergence; (b) autocorrelation; (c) kurtosis; (d) Kleinberg's burst model.

46. The method of claim 43 wherein predicting the average precision comprises using a Kullback-Leibler divergence.

47. The method of claim 43 wherein predicting the average precision comprises using a learning algorithm.

48. The method of claim 47 wherein predicting the average precision comprises using at least one of: (a) a decision tree; (b) a neural network; or (c) a support vector machine.

49. The method of claim 38 wherein determining the relevance comprises classifying the temporal profile.

50. The method of claim 49 wherein classifying the temporal profile comprises determining whether the temporal profile indicates the search query is temporally ambiguous.

51. The method of claim 49 wherein classifying the temporal profile comprises determining whether the temporal profile indicates the search query is not temporally unambiguous; and not atemporal.

52. The method of claim 38 wherein influencing comprises influencing a rank order of the search results in a listing based on the temporal profile.

53. The method of claim 52 comprising receiving the temporal relevance feedback from a user input to the interactive timeline.

54. The method of claim 53 further comprising generating search results for presentation to the user based on the temporal relevance feedback received from the user.

55. The method of claim 38 wherein identifying the temporal profile further comprises smoothing the temporal data associated with a results set of documents.

56. The method of claim 38 wherein influencing comprises modifying an algorithm for retrieving documents.

57. A method for predicting precision of search queries comprising:
receiving a search query from a user;
identifying a temporal profile of the search query from temporal data associated with documents retrieved in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
identifying the search query as one of temporally ambiguous, temporally unambiguous or atemporal to the user;
determining temporal features of the temporal profile using at least one of: (a) Kullback-Leibler divergence; (b) autocorrelation; (c) kurtosis; (d) Kleinberg's burst model;
predicting an average precision of the search query using a combination of at least one of the temporal features of the temporal profile and a content feature of the documents retrieved in response to the search query, as well as the identification of the query as temporally ambiguous, temporally unambiguous or atemporal.

58. The method of claim 57 wherein predicting comprises using a learning algorithm.

59. The method of claim 58 wherein predicting comprises using at least one of: (a) a decision tree; (b) a neural network; or (c) a support vector machine.

60. The method of claim 57 wherein identifying comprises using a Kullback-Leibler divergence.

61. The method of claim 57 wherein identifying the temporal profile further comprises smoothing the temporal data associated with a results set of documents.

62. A system for providing search results in response to a search query, the system comprising:
a) a computer adapted to receive a search query from a user; and
b) the computer comprising a processor, the processor having processor executable instructions for:
building a temporal profile of the search query from temporal data associated with documents retrieved in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
identifying the search query as one of temporally ambiguous, temporally unambiguous or atemporal to the user;
determining from features of the temporal profile whether the search query would benefit from relevance feedback from the user, the determination also based on the identification of the search query as temporally ambiguous, temporally unambiguous or atemporal to the user;
seeking relevance feedback from the user if there is a determination that the search query will benefit from the relevance feedback from the user; and
providing search results based on the relevance feedback.

63. The system of claim 62 wherein determining comprises classifying the search query based on the temporal profile of the search query.

64. The system of claim 63 wherein determining comprises using a combination of features comprising: (a) divergence; (b) autocorrelation; (c) statistics of the rank order; or (d) burst model.

65. The system of claim 63 wherein determining comprises using a combination of features comprising: (a) Kullback-Leibler divergence; (b) autocorrelation; (c) kurtosis; (d) Kleinberg's burst model.

66. The system of claim 62 wherein determining comprises predicting an average precision of the search query using a combination of the features of the temporal profile.

67. The system of claim 66 wherein determining comprises predicting an average precision of the search query using a combination of the features of the temporal profile and a content feature.

68. The system of claim 67 wherein determining comprises using a combination of features comprising: (a) divergence; (b) autocorrelation; (c) statistics of the rank order; or (d) burst model.

69. The system of claim 67 wherein determining comprises using a combination of features comprising: (a) Kullback-Leibler divergence; (b) autocorrelation; (c) kurtosis; (d) Kleinberg's burst model.

70. The system of claim 69 wherein determining comprises using a content clarity.

71. The system of claim 69 wherein determining comprises using the Kullback-Leibler divergence.

72. The system of claim 71 wherein determining comprises using a content clarity.

73. The system of claim 67 wherein predicting the average precision comprises using a predictive model.

74. The system of claim 73 wherein predicting the average precision comprises using a learning algorithm.

75. The system of claim 74 wherein predicting the average precision comprises using at least one of: (a) a decision tree; (b) a neural network; or (c) a support vector machine.

76. The system of claim 62 wherein seeking relevance feedback from the user further comprises constructing a display capable of being displayed at an interactive user interface, the display incorporating an indication of a temporal nature of the search query.

77. The system of claim 76 wherein constructing a display comprises a constructing a timeline comprising temporal event indicators and corresponding event summaries.

78. The system of claim 77 wherein constructing a display comprises constructing a non-extractive event summary.

79. The system of claim 77 wherein constructing a display comprises constructing a sentence likelihood event summary.

80. The system of claim 77 wherein constructing a display comprises constructing an extractive event summary.

81. The system of claim 76 wherein constructing a display comprises constructing a listing.

82. The system of claim 62 wherein building temporal profile comprises smoothing the temporal data.

83. The system of claim 62 wherein providing search results comprises modifying an algorithm for retrieving documents.

84. A system for providing search results in response to a search query, the system comprising:
   a) a computer adapted to receive a search query from a user; and
   b) the computer comprising a processor, the processor having processor executable instructions for:
   building a temporal profile of the search query from temporal data associated with documents retrieved in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   identifying the search query as one of temporally ambiguous, temporally unambiguous or atemporal to the user;
   classifying the search query using the temporal features of the temporal profile including the identification of the search query as temporally ambiguous, temporally unambiguous or atemporal; and
   constructing an interactive display capable of being presented to the user for obtaining query specific relevance feedback from the user if the search query is classified as temporally ambiguous.

85. The system of claim 84 wherein classifying comprises using a combination of features comprising: (a) divergence; (b) autocorrelation; (c) statistics of the rank order; or (d) burst model.

86. The system of claim 84 wherein classifying comprises using a combination of features comprising: (a) Kullback-Leibler divergence; (b) autocorrelation; (c) kurtosis; (d) Kleinberg's burst model.

87. The system of claim 84 wherein classifying comprises using a Kullback-Leibler divergence.

88. The system of claim 84 wherein constructing the interactive display comprises constructing a timeline comprising:
   a) temporal event indicators; and
   b) temporal event summaries corresponding with the temporal event indicators.

89. The system of claim 84 wherein predicting the average precision comprises using a learning algorithm.

90. The system of claim 89 wherein predicting the average precision comprises using at least one of: (a) a decision tree; (b) a neural network; or (c) a support vector machine.

91. A system for providing search results in response to a search query, the system comprising:
   a) a computer adapted to receive a search query from a user; and
   b) the computer comprising a processor, the processor having processor executable instructions for:
   building a temporal profile of the search query from temporal data associated with documents retrieved in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   predicting an average precision of the search query using a combination of at least one temporal feature of the temporal profile and a content feature of the documents retrieved in response to the search query;
   identifying the search query as one of temporally ambiguous, temporally unambiguous or atemporal to the user;
   determining from the average precision whether the search query would benefit from relevance feedback from the user, the determination also based on the identification of the search query as temporally ambiguous, temporally unambiguous or atemporal to the user; and
   constructing an interactive display capable of being presented to the user for obtaining the relevance feedback from the user if there is a determination that the search query will benefit from the relevance feedback from the user.

92. The system of claim 91 wherein constructing the interactive display comprises constructing a timeline comprising:
   a) temporal event indicators; and
   b) temporal event summaries corresponding with the temporal event indicators.

93. The system of claim 92 wherein predicting the average precision comprises using a combination of temporal features comprising: (a) divergence; (b) autocorrelation; (c) statistics of the rank order; or (d) burst model.

94. The system of claim 93 wherein predicting the average precision comprises using a combination of temporal features comprising: (a) Kullback-Leibler divergence; (b) autocorrelation; (c) kurtosis; (d) Kleinberg's burst model.

95. The system of claim 92 wherein predicting comprises using a Kullback-Leibler divergence.

96. The system of claim 91 wherein predicting the average precision comprises using a learning algorithm.

97. The system of claim 96 wherein predicting the average precision comprises using at least one of: (a) a decision tree; (b) a neural network; or (c) a support vector machine.

98. A system for providing search results in response to a search query, the system comprising:
   a) a computer adapted to receive a search query from a user; and
   b) the computer comprising a processor, the processor having processor executable instructions for:
   receiving a search query;
   building a temporal profile of the search query from temporal data associated with documents retrieved by a search engine in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
   performing at least one of: (1) classifying the search query using the temporal features of the temporal profile; or (2) predicting an average precision of the search query using a combination of at least one temporal feature of the temporal profile and a content feature of the documents retrieved in response to the search query;
   identifying the search query as one of temporally ambiguous, temporally unambiguous or atemporal to the user;
   determining from performing the at least one of classifying or predicting the average precision whether the search query would benefit from relevance feedback from the user including based on the identification of the search query as temporally ambiguous, temporally unambiguous or atemporal;

constructing an interactive timeline for display to the user if there is a determination that the search query will benefit from the relevance feedback from the user;

modifying the algorithm for retrieving documents based on a selection by the user from the timeline; and providing search results for display to the user using the modified algorithm for retrieving documents.

99. A system for providing search results in response to a search query, the system comprising:
a) a computer adapted to receive a search query from a user; and
b) the computer comprising a processor, the processor having processor executable instructions for:
receiving a search query;
identifying a temporal profile of the search query from search results retrieved by a search engine in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
identifying the search query as one of temporally ambiguous, temporally unambiguous or atemporal to the user;
determining a relevance of the temporal profile of the search query including based on the identification of the search query as temporally ambiguous, temporally unambiguous or atemporal; and
influencing a presentation of the search results based on the temporal profile of the query.

100. The system of claim 99 wherein influencing comprises generating an interactive timeline based on the temporal profile of the search query.

101. The system of claim 100 wherein generating the interactive timeline comprises generating a timeline comprising:
a) temporal event indicators; and
b) temporal event summaries corresponding with the temporal event indicators.

102. The system of claim 100 further comprising receiving the temporal relevance feedback from a user input to the interactive timeline.

103. The system of claim 102 further comprising generating search results for presentation to the user based on the temporal relevance feedback received from the user.

104. The system of claim 103 wherein determining comprises predicting an average precision of the search query using a combination of at least one temporal feature of the temporal profile and a content feature of documents retrieved in response to the search query.

105. The system of claim 104 wherein predicting the average precision comprises using a combination of temporal features comprising: (a) divergence; (b) autocorrelation; (c) statistics of the rank order; or (d) burst model.

106. The system of claim 105 wherein predicting the average precision comprises using a combination of temporal features comprising: (a) Kullback-Leibler divergence; (b) autocorrelation; (c) kurtosis; (d) Kleinberg's burst model.

107. The system of claim 104 wherein predicting the average precision comprises using a Kullback-Leibler divergence.

108. The system of claim 104 wherein predicting the average precision comprises using a learning algorithm.

109. The system of claim 108 wherein predicting the average precision comprises using at least one of: (a) a decision tree; (b) a neural network; or (c) a support vector machine.

110. The system of claim 99 wherein determining the relevance comprises classifying the temporal profile.

111. The system of claim 110 wherein classifying the temporal profile comprises determining whether the temporal profile indicates the search query is temporally ambiguous.

112. The system of claim 110 wherein classifying the temporal profile comprises determining whether the temporal profile indicates the search query is not temporally unambiguous; and not atemporal.

113. The system of claim 99 wherein influencing comprises influencing a rank order of the search results in a listing based on the temporal profile.

114. The system of claim 113 comprising receiving the temporal relevance feedback from a user input to the interactive timeline.

115. The system of claim 114 further comprising generating search results for presentation to the user based on the temporal relevance feedback received from the user.

116. The system of claim 99 wherein identifying the temporal profile further comprises smoothing the temporal data associated with a results set of documents.

117. The system of claim 99 wherein influencing comprises modifying an algorithm for retrieving documents.

118. A system for providing search results in response to a search query, the system comprising:
a) a computer adapted to receive a search query from a user; and
b) the computer comprising a processor, the processor having processor executable instructions for:
receiving a search query;
identifying a temporal profile of the search query from temporal data associated with documents retrieved in response to the search query, the temporal profile capable of being temporally ambiguous, the temporal profile capable of being temporally unambiguous, and the temporal profile capable of being atemporal, such that the temporal profile is at least one of: temporally ambiguous, temporally unambiguous, and atemporal;
identifying the search query as one of temporally ambiguous, temporally unambiguous or atemporal to the user;
determining temporal features of the temporal profile using at least one of: (a) Kullback-Leibler divergence; (b) autocorrelation; (c) kurtosis; (d) Kleinberg's burst model; and
predicting an average precision of the search query using a combination of at least one of the temporal features of the temporal profile and a content feature of the documents retrieved in response to the search query including based on the identification of the search query as temporally ambiguous, temporally unambiguous or atemporal.

119. The system of claim 118 wherein predicting comprises using a learning algorithm.

120. The system of claim 119 wherein predicting comprises using at least one of: (a) a decision tree; (b) a neural network; or (c) a support vector machine.

121. The system of claim 118 wherein identifying comprises using a Kullback-Leibler divergence.

122. The system of claim 118 wherein identifying the temporal profile further comprises smoothing the temporal data associated with a results set of documents.

* * * * *